Patented July 31, 1928.

1,679,294

UNITED STATES PATENT OFFICE.

FERDINAND DIETZSCH, OF KINGSTON-ON-THAMES, ENGLAND.

TREATMENT OF ORES OF COPPER AND OTHER METALS.

No Drawing. Application filed October 31, 1927, Serial No. 230,170, and in Great Britain July 7, 1926.

A known treatment of oxides or oxidized ores consists in heating them with alkali sulphate for the purpose of converting values into metal sulphates capable of being easily leached from the ore.

I have found that, when certain oxide ores and badly roasted ores are heated with a proportion of alkali sulphate or alkaline earth sulphate quite insufficient to have any appreciable sulphatizing effect, and in any case not exceeding two per cent of the weight of the ore, the ore thus treated yields a larger proportion of values when subsequently leached with any of the usual leaching agents than is yielded by the ore leached without this treatment. The same applies to ores which are roasted with the said proportion of the sulphate.

I am unable to explain this phenomenon and I find that it is not every ore which is benefited by the treatment. It is easy, however, to ascertain by a preliminary test whether the treatment is beneficial in the case of any given ore.

The main cause of poor extraction by leaching is the existence of ferrites in a roasted ore, and the yield from ores which contain ferrites, after they have been roasted, is improved if a small proportion of an alkali sulphate or alkaline earth sulphate is added to the ore before it is roasted, or if the roasted ore containing ferrites is again heated with the addition of sulphate.

I find that the use of a small proportion of sulphate according to this invention improves the extraction by leaching better than a larger proportion does. For example a certain copper ore, after it has been roasted with 5 per cent by weight of anhydrous sodium sulphate, yielded, by extraction with sulphurous acid and a saturated solution of sodium chloride, 91.2 per cent of its copper, whereas when roasted with 1 per cent by weight of the sulphate and then extracted by the same medium, it yielded 96.5 per cent.

The invention is particularly useful in the treatment of ores of copper and of zinc when the leaching liquor used is a solution of a metal chloride and sulphurous acid. Extraction by other solvents is also improved, however; for instance the yield of gold by cyanide extraction may be increased by the preliminary treatment according to the invention.

The following examples illustrate the invention:—

*Example 1.*—A crushed copper ore, consisting substantially of sulphides of copper and iron was roasted at a low temperature until all apparent action had finished, when the temperature was raised gradually to about 550° C. and was kept at this degree for about two hours; it was then further raised to 650° C. for another two hours to complete the decomposition of all the sulphides. In spite of the carefully conducted roast, the product yielded to leaching with sulphuric acid of 5 per cent strength at 60° C. for 7 hours, only 87.4 per cent of its content of copper.

Another quantity of the same crushed ore was moistened with an aqueous solution of sodium sulphate so that the moist ore contained an amount of the sulphate equal to 1 per cent of the dry ore. It was then dried and roasted for 4½ hours at 600° C. The roasted ore was extracted with sulphuric acid of 5 per cent strength in the manner described above and yielded 95.5 per cent of its content of copper.

The corresponding figures for extraction of the roasted ore with a saturated solution of sodium chloride charged with sulphur dioxide were 75.2 per cent and 96.5 per cent.

*Example 2.*—A batch of pyrites cinders assaying 2.31 per cent of copper were treated for 30 hours with a saturated solution of sodium chloride saturated with sulphur dioxide. After washing the tailings, they were found to contain 0.462 per cent of copper, corresponding with an extraction of 80 per cent.

Another batch of the same pyrites cinders was moistened with a solution of sodium sulphate so that the moist mass contained sodium sulphate equal to 1 per cent of the dried cinders. The mass was heated in a furnace for 2 hours at 600° C. and then assayed 2.35 per cent of copper. When cool it was treated with the chloride solution referred to above for 12 hours. After washing the tailings they were found to assay 0.11 per cent of copper, corresponding with a 95.32 per cent extraction.

The use of a solution of sodium sulphate in the foregoing examples was for convenience in obtaining an intimate mixture of the material treated and the sodium sulphate. Dry mixing is, of course, also practicable.

Having thus described the nature of my said invention and the best means I know of carrying the same into practical effect, I claim:—

1. A process of treating copper sulphide ores, which consists in mixing the oxidized ore with a proportion, not exceeding 2 per cent of its weight, of a sulphate of the group comprising alkali sulphate and alkaline earth sulphate, heating the mixture and finally extracting the values.

2. A process of treating copper sulphide ores, which consists in mixing the ore with a proportion, not exceeding 2 per cent of its weight, of a sulphate of the group comprising alkali sulphate and alkaline earth sulphate, roasting the mixture and finally extracting the values.

3. A process for treating copper sulphide ores, which consists in mixing the oxidized ore with an alkali sulphate in proportion not exceeding 2 per cent of the weight of the ore, heating the mixture, and finally extracting the values.

4. A process for treating copper sulphide ores, which consists in mixing the ore with an alkali sulphate in proportion not exceeding 2 per cent of the weight of the ore, roasting the mixture, and finally extracting the values.

In witness whereof I have signed my name to this specification.

FERDINAND DIETZSCH.